(12) United States Patent
Bernard

(10) Patent No.: US 10,297,173 B2
(45) Date of Patent: May 21, 2019

(54) MAGNET ANCHORS AND METHOD AND APPARATUS FOR INSTALLING MAGNETS AND FOR HANGING A SIGN

(71) Applicant: Robina Bernard, Brantford (CA)

(72) Inventor: Robina Bernard, Brantford (CA)

( * ) Notice: Subject to any disclaimer, the term of this patent is extended or adjusted under 35 U.S.C. 154(b) by 0 days.

(21) Appl. No.: 15/697,874

(22) Filed: Sep. 7, 2017

(65) Prior Publication Data

US 2018/0075785 A1 Mar. 15, 2018

Related U.S. Application Data

(60) Provisional application No. 62/385,413, filed on Sep. 9, 2016.

(51) Int. Cl.
| | | |
|---|---|---|
| *F16B 1/00* | (2006.01) | |
| *G09F 7/18* | (2006.01) | |
| *E04B 9/18* | (2006.01) | |
| *F16B 2/24* | (2006.01) | |
| *F16M 13/02* | (2006.01) | |
| *F16B 5/06* | (2006.01) | |
| *F16B 37/04* | (2006.01) | |

(52) U.S. Cl.
CPC ............... *G09F 7/18* (2013.01); *E04B 9/18* (2013.01); *F16B 1/00* (2013.01); *F16B 2/24* (2013.01); *F16B 5/0685* (2013.01); *F16M 13/02* (2013.01); *F16B 37/045* (2013.01); *F16B 2001/0028* (2013.01); *F16B 2001/0035* (2013.01); *G09F 2007/186* (2013.01); *G09F 2007/1852* (2013.01)

(58) Field of Classification Search
CPC ...... G09F 7/18; G09F 2007/1852; G09F 9/18; G09F 2007/86; E04B 9/18; F16B 1/00; F16B 2/24; F16B 13/02; F16B 2001/0028; F16B 2001/0035; F16B 5/0685; F16B 37/045
USPC .............. 248/544, 328, 309.4; 294/24, 211
See application file for complete search history.

(56) References Cited

U.S. PATENT DOCUMENTS

| | | | | |
|---|---|---|---|---|
| 5,188,332 | A * | 2/1993 | Callas .................... | G09F 7/18 248/206.5 |
| 5,381,991 | A * | 1/1995 | Stocker .................. | G09F 7/18 248/206.5 |
| 5,422,622 | A | 6/1995 | Sakamoto | |
| 5,642,871 | A * | 7/1997 | Repert ................... | A47K 5/05 248/206.5 |
| 5,938,255 | A * | 8/1999 | Rose ..................... | A47F 13/06 248/340 |

(Continued)

*Primary Examiner* — Nkeisha Smith

(57) ABSTRACT

A flush magnet anchor comprises an anchor body having first and second exterior and opposing surfaces; and a magnet mounted in a recess of the body such that an exterior surface of the magnet and the first exterior surface of the body are coplanar. A tether (e.g. eyelet) in the second exterior surface receives a ring. The body, shaped as a bowl having a rim, has the magnet mounted in the bowl. A magnet installing and removing apparatus comprises a base forming a channel; and at least two magnet heads mounted to the base in the channel, each of the at least two magnet heads configured to receive respective magnet anchors; and wherein the magnet heads are selectively movable along the base in the channel. The base may be an extruded rail, e.g. of a U-shape with upper ends turned in. The apparatus may couple to an extension pole.

20 Claims, 4 Drawing Sheets

(56) References Cited

U.S. PATENT DOCUMENTS

| | | | |
|---|---|---|---|
| 6,422,622 B1* | 7/2002 | Bernard | G09F 7/18 |
| | | | 294/209 |
| 7,722,100 B2 | 5/2010 | Suciu et al. | |
| 7,743,541 B2* | 6/2010 | Suciu | G09F 3/20 |
| | | | 248/229.1 |
| 7,845,609 B2* | 12/2010 | Bernard | E04B 9/18 |
| | | | 24/122.6 |
| 9,697,754 B2* | 7/2017 | White | G09F 7/18 |
| 9,898,941 B2* | 2/2018 | White | G09F 7/18 |
| 2012/0104198 A1* | 5/2012 | Phillips, Sr. | A47B 96/061 |
| | | | 248/206.5 |
| 2013/0118072 A1 | 5/2013 | Nee et al. | |
| 2016/0203741 A1* | 7/2016 | White | A47F 13/06 |
| | | | 248/544 |
| 2016/0252239 A1* | 9/2016 | Tremaine | H01R 25/14 |
| | | | 248/49 |
| 2016/0265718 A1* | 9/2016 | White | G09F 7/18 |
| 2016/0309927 A1* | 10/2016 | Krake | A47G 1/17 |
| 2017/0086602 A1* | 3/2017 | White | A47F 5/0838 |

\* cited by examiner

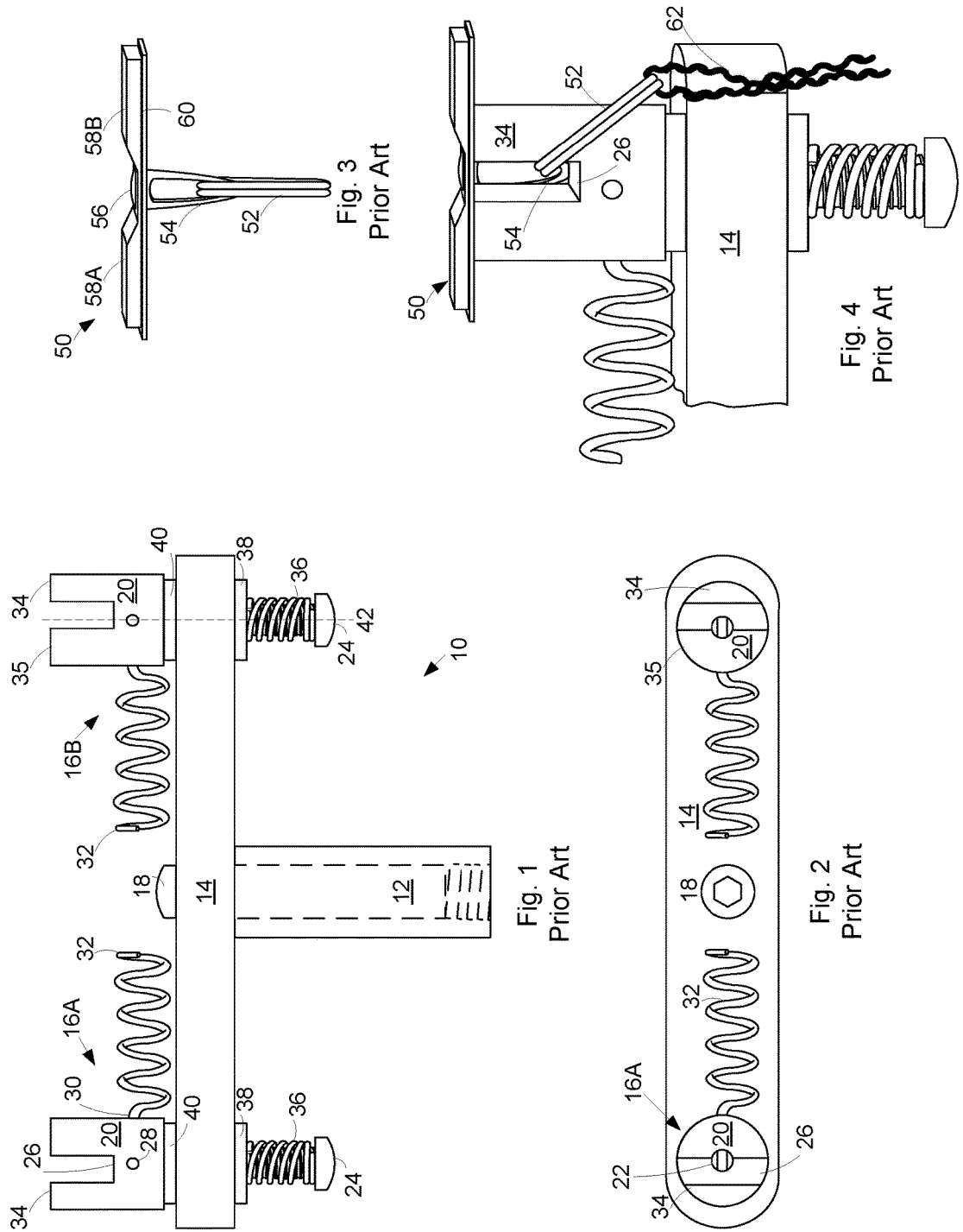

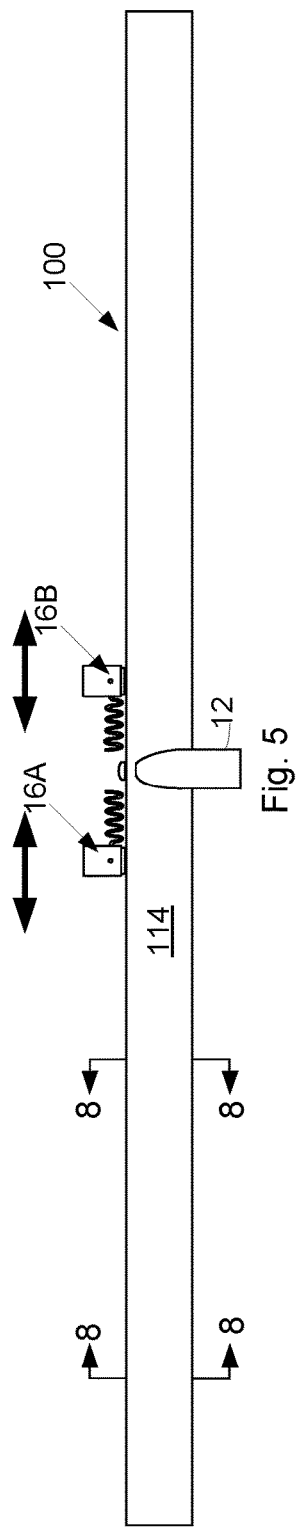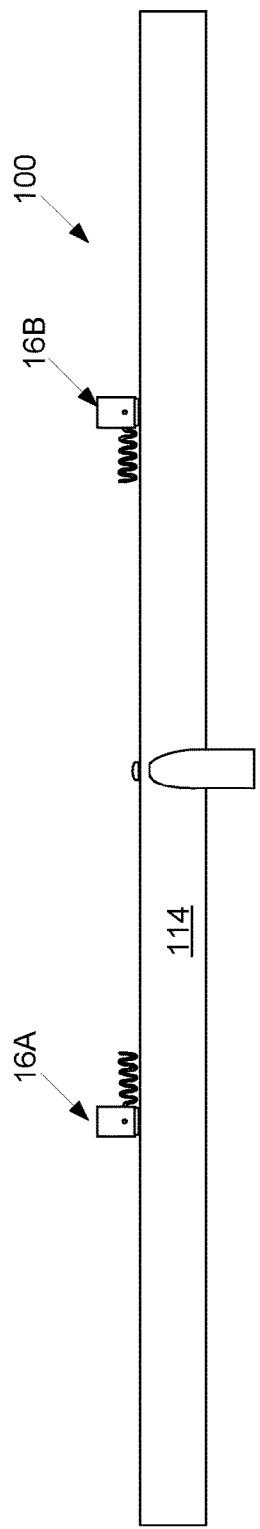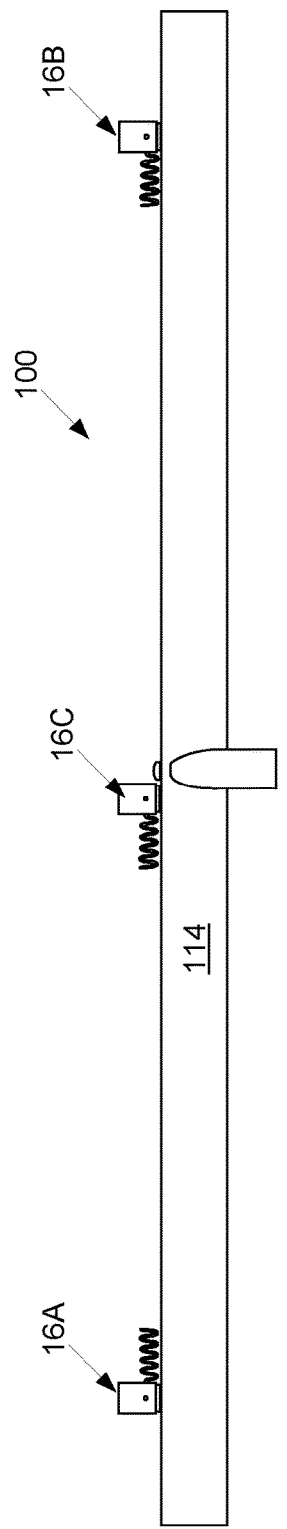

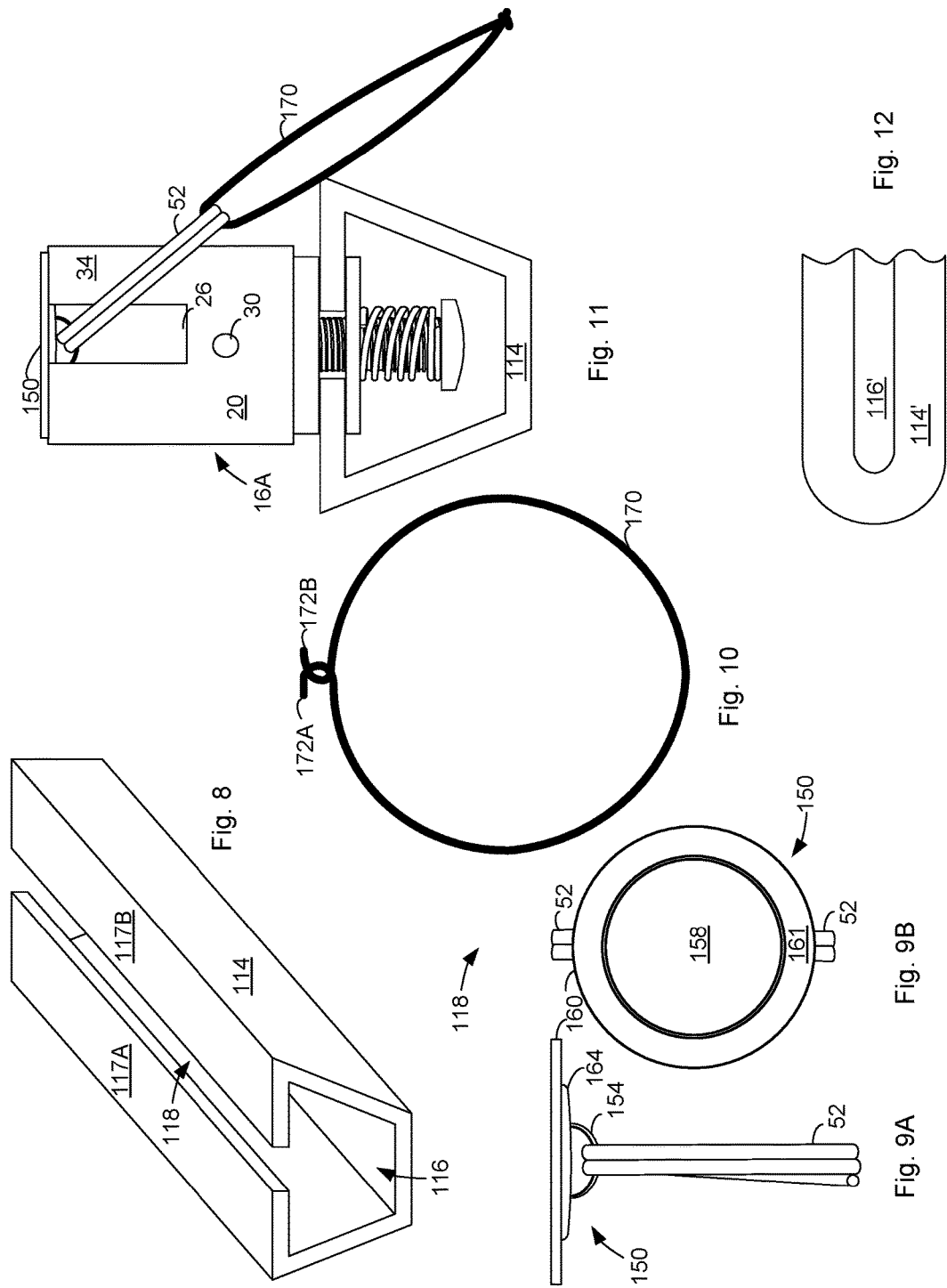

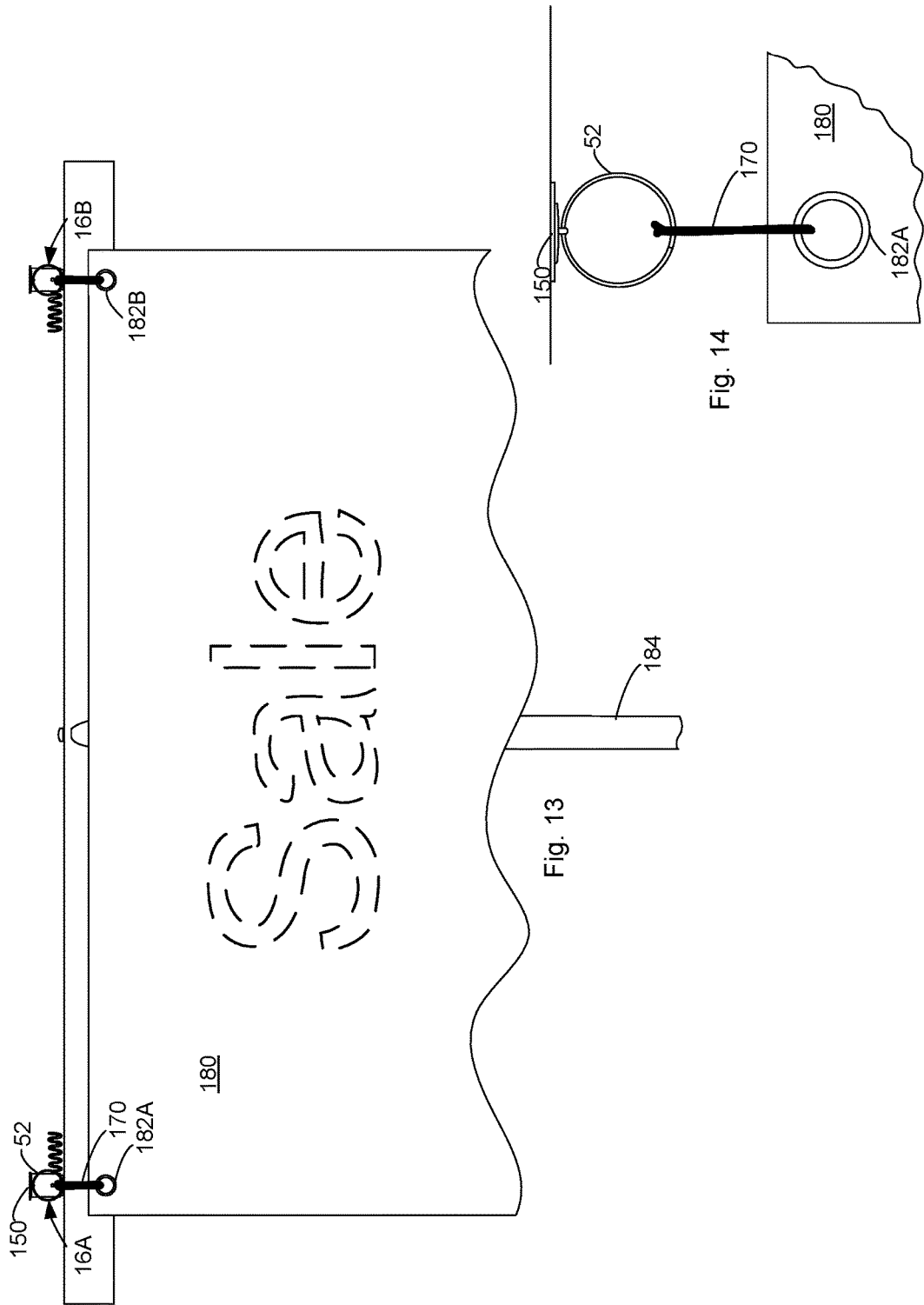

1

MAGNET ANCHORS AND METHOD AND APPARATUS FOR INSTALLING MAGNETS AND FOR HANGING A SIGN

CROSS REFERENCE

This application claims the benefit of U.S. Provisional Patent Application No. 62/385,413 filed Sep. 9, 2016 which is incorporated herein by reference.

FIELD OF THE INVENTION

This invention relates to magnetic anchors, a method and apparatus for installing magnets such as the magnetic anchors and for a method and apparatus for hanging a sign from a surface using magnets spaced along the surface.

BACKGROUND

It is well known to suspend or hang signs, banners, balloon displays and the like objects from metal structures on walls or ceilings such as steel channels and tile suspension strips, fixtures etc. by means of magnets and mechanical devices. U.S. Pat. No. 6,422,622 issued Jul. 23, 2002 shows an installation and removal apparatus for installing and removing a magnet anchor having a ring of a predetermined diameter tethered to the magnet anchor such as for anchoring an object to and removing the object from a magnetic structure. The installation and removal apparatus may be configured with pairs of magnet carrying heads spaced along the apparatus at a fixed distance. U.S. Pat. No. 7,845,609 issued Dec. 7, 2010 shows a loop line and method for evenly hanging an object from such magnet anchors. The object may be a sign or banner, etc. having grommets through which respective even-length lengths of the loop line may be secured such as by using a hitch knot at one end. The opposite ends of the loop lines may be secured to respective rings of the magnet anchors. These patents are incorporated herein by reference.

An installer may choose a length of loop line to suspend the object below the anchors to a desired length and the installing and removal apparatus is configured to install the magnets accordingly, provided that the minimum length of loop line must be sufficient to extend between the anchors, when sitting on the respective magnet carrying heads, and the grommets of the object. If the object is wide and the grommets widely spaced, the sign will be suspended below the surface at least the length of the loop lines.

SUMMARY

It is desired to have an installing and removal apparatus which will permit installing magnet anchors at variable spacing along the surface so that the object may be suspended closer to the surface.

There is provided a flush magnet anchor comprising an anchor body having first and second exterior and opposing surfaces, the anchor body forming a recess; and a magnet mounted in the recess such that an exterior surface of the magnet and the first exterior surface of the anchor body are coplanar; and wherein the anchor body comprises a tether in the second exterior surface. The tether may be an eyelet formed in the second exterior surface. The anchor body may be shaped as a bowl having a rim defining the first exterior surface and the magnet may be mounted in the bowl. The anchor body may be of a ferromagnetic material. A ring may be mounted in the tether.

There is provided a magnet installing and removing apparatus comprising: a base forming a channel; at least two magnet heads mounted to the base in the channel, each of the at least two magnet heads configured to receive respective magnet anchors; wherein the magnet heads are selectively movable along the base in the channel.

The base may comprise an extruded rail defining the channel where the channel has a channel opening. The extruded rail may be an aluminium alloy.

The base may comprise a generally U-shape with upper ends of the U shape turned inwardly toward one another to define the channel opening along which the magnet heads may be moved.

The magnet installing and removing apparatus may comprise ends caps for the extruded rail.

The base may be secured to an installation head configured to mount to an installation pole.

Each of the at least two magnet heads may comprise a hook (e.g. a cork screw or helix) for removing an installed magnet anchor.

Each of the magnet heads may comprise a body having a transverse channel defining a leg to receive a ring of a magnet anchor. Each of the magnet heads may comprise a fastener and at least one washer for mounting to the base. The at least one washer comprises a plastic body or coating for slidably moving along the base. There may be a spring around the fastener biasing the at least one washer against the base.

There is provided a method of hanging an object having spaced apart anchor points comprising: providing a magnet installing and removing apparatus as described, the apparatus having a magnet head for each of the spaced apart anchor points; aligning each magnet head to align with the spaced apart anchor points; coupling respective magnet anchors to the anchor points; mounting the respective magnet anchors to each magnet head; and installing the respective magnet anchors to a magnetic surface. The method may comprise sliding each magnet head along the base to align with the spaced apart anchor points.

The respective magnet anchors may be flush magnet anchors as described. The magnet anchors may be coupled to the anchor points using a clip. The object may be a sign having apertures defining the anchor points.

BRIEF DESCRIPTION OF THE DRAWINGS

FIGS. 1 and 2 show an installing and removing apparatus in side and top views in accordance with the prior art.

FIG. 3 shows a magnet anchor with a ring in an isometric view in accordance with the prior art.

FIG. 4 shows an isometric view of the magnet anchor on one of the magnet heads of the installing and removing apparatus with a loop line through the ring in accordance with the prior art.

FIGS. 5-7 show a new installing and removing apparatus in a side view with pairs of magnet heads in different positions or with three magnet heads.

FIG. 8 shows a section of a base of the installing and removing apparatus in an isometric view, along lines 8-8 of FIG. 5.

FIGS. 9A and 9B show a side and top view of a flush magnet anchor with a ring.

FIG. 10 shows a new clip.

FIG. 11 shows an end view of a magnet head mounted in the installing and removing apparatus, the magnet heat carrying a flush magnet anchor with a ring and a clip on the ring.

FIG. 12 shows a top sectional view of an alternative to the base design of FIG. 8.

FIG. 13 shows installing and removing apparatus in a side view and in an operative combination with flush magnet anchors, clips, a sign and a portion of an extension pole.

FIG. 14. shows an enlarged fragmentary view of a corner of the sign hung from the magnet anchor and clip such as to a ceiling.

DETAILED DESCRIPTION

FIGS. 1 and 2 show an installing and removing apparatus 10 in side and top views in accordance with the prior art. Apparatus 10 comprises an installation head 12 and base 14 through which are mounted a pair of magnet heads 16A, 16B at a fixed distance apart. Head 12, base 14 and magnet heads 16A and 16B (parts thereof) are preferably made from non-magnetic materials such as nylon plastic, wood, aluminium alloy, etc. Head 12 may be a hollow cylindrical body with internal threads (shown in dotted lines) for mounting to an installation pole (not shown), which pole may be extensible. One end of head 12 may be closed and have a bore formed therein for a fastener 18 securing head 12 to base 14. Base 14 may be a linear bar, or other shape, having respective bores therethrough for securing the head 12 and the respective magnet heads 16A and 16B.

Each magnetic head comprises a head body 20 generally cylindrical in shape and having a longitudinal bore 22 at least partially threaded for receiving a threaded fastener 24, a transverse channel 26 for receiving a magnet anchor as described further and a pair of orthogonal bores 28 and 30 of which only 30 is used to received a hook 32 such as a cork screw for removing a magnet anchor after installation. The other orthogonal bore 28 is optional. Transverse channel 26 is positioned (e.g. by cutting) in body 20 off-centre such that head 20 has a leg 34 that is smaller than the other leg 35. The location of the orthogonal bores may be configured to direct the hook 32 radially from the head and relative to the direction of the channel 26 (e.g. either parallel or orthogonal thereto). The heads 16A and 16B may be installed to be mirror images of one another. In the present example, the heads are mirror images with the legs 34 toward the outside of the base 14.

Each fastener 24 may carry a spring 36 and pass through washers 38 and 40. Spring 36 biases the washers 38 to base 14 but may be configured to allow the body 20 to rotate around the longitudinal axis 42. This rotation allows the hooks to extend orthogonal to the longitudinal axis of base 20 to assist in removing an anchor but be located parallel and over the base 20 when not need for use for safety purposes.

FIG. 3 shows a magnet anchor 50 with a ring 52 in an isometric view in accordance with the prior art. Ring 52 may be a split ring or key ring which may be secured to anchor 50 via an elongated eye or tether 54, for example, configured as a rivet having a head 56. Tether 54 and head 56 may be a unitary plastic body. Anchor 50 may house one or more magnets 58A 58B in encased in a two plastic body 60. Ring 52 is usually of a predetermined diameter sized to fit with the magnet heads.

FIG. 4 shows an isometric and fragmentary view of the magnet anchor 50 on one of the magnet heads 16B of the installing and removing apparatus 10 with a piece of loop line 62 through the ring 52 in accordance with the prior art. Tether 54 is received in channel 26 and leg 34 receives ring 52. The other end of loop line 62 (not shown) may be secured to an object to be hung. Similarly another magnet anchor 50 may be mounted to magnet head 16A and an even-length of loop line secured to the object.

In practice, an installing and removing apparatus of FIGS. 1-4 may be configured such that base 12 is about 17 inches (18 cm) wide. A magnet head body 20 is about ⅞ inch (2 cm) high and are spaced about 6 inches (15.5 cm) apart on centre.

To install a sign or other object having spaced anchor points, typically comprising apertures in the object which may be protected by grommets, even-lengths of length loop line 62 are respectively secured to each anchor point at one end of the line 62 and to rings 52 of respective magnet anchors 50 at the other end of the line. While loop line is preferred due to its evenly spaced loops that are preset to enable even hanging, other lines may be used. The magnet anchors 50 are mounted to the heads 16A and 16B. Apparatus 10 is typically attached to a pole (e.g. before the magnets are mounted). The pole is lifted to raise the magnet anchors to the respective desired location on a mounting surface such as a metal portion of a ceiling, wall, etc. In turn each magnet anchor is installed to release the anchor and the dependent object from the apparatus 10. The hooks 32 may be individually inserted into the rings 52 to remove the anchors (and the object) from installation. One hook 32 may be used to remove one anchor 50.

It is apparent that the fixed width or spacing of magnet heads 16A and 16B limits the ability to install magnet anchors that are closely spaced to the sign or other object to be hung when the object has anchor points that are spaced further apart.

FIGS. 5-7 show a new installing and removing apparatus 100 in a side view with pairs of magnet heads 16A and 16B in different positions or with three magnet heads 16A, 16B and 16C. For simplicity, components of apparatus 100 that are interchangeable with those of apparatus 10 are similarly numbered and different or new components are pre-fixed with the number 100. It is understood that additional magnet heads may be mounted to the apparatus 100. Arrows indicate that the magnet heads may be selectively positioned along a base 114 so as to adjust to the demands of a particular sign or object. It will be noted that each hook 32 is mounted in bore 28 rather than 30.

Base 114 is better shown in FIG. 8 which shows a section thereof in an isometric view, along lines 8-8 of FIG. 5. A total length of approximately 25 inches (63 cm) may be preferred for base 114 but wider or shorter lengths may be used, balancing weight and other practical considerations. In one example, base 114 may comprise an extruded rail of aluminium alloy. Other non-metallic material (e.g. plastic) may be used that is sufficiently sturdy and not likely to break for the intended task. Base 114 forms a longitudinal channel 116 having an upper opening 118 for receiving the magnet heads (16A, 16B, etc.). The channel 116 provides selective and granular (unrestricted) positioning along the base 114. In an end view profile base 114 comprises a generally U-shape with upper ends 117A and 117B of the U shape turned inwardly toward one another to define the upper opening 118. Each end of base 114 may be covered by a respective end cap such as of plastic (not shown) friction fit to the end or otherwise mounted. Other base shapes and configurations may be used. FIG. 12 illustrates a fragmentary top view of a base 114' similar to base 14 but where a channel 116' is provided for receiving magnet heads at desired positions along the base, again offering unrestricted positioning along the length. Base 114' may be of a similar length to base 114.

In one example, useful with any of the configurations, the washers 38 or 40 or both 38 and 40 of a magnet head may be constructed of a hard plastic (e.g. nylon, polytetrafluoroethylene (Teflon®)) or coated to assist with gliding along channel 116.

FIGS. 9A and 9B show a side and top view of a flush magnet anchor 150 with a ring 52. Ring 52 is secured to an anchor body 160 via short eyelet or tether 154 formed in an exterior surface. Anchor body 160 may comprise a metal base 162 (which may be attractive to a magnetic force) having a slight recess 164 and a magnet 158 mounted (e.g. cemented or otherwise affixed) to the anchor body 160 within the recess 164. The anchor body 160 shown is generally circular (when viewed from above or below) and bowl-shaped (when viewed from a side) with a relatively broad rim 161 to at least partially surround a cylindrical or disk-shaped magnet 158. Broad rim 161 provides an exterior surface generally opposing the other exterior surface having the tether.

In the example, the magnet 158 and upper surface (on rim 161) of the anchor body 160 are generally flush to one another (co-planer). The anchor body with the eyelet gives the flush magnet anchor an overall button shape. With a ferromagnetic material for the anchor body 160, (e.g. an iron or nickel containing alloy) rim 161 extends the overall magnetic surface of the flush magnet anchor 150. In one example, the anchor body 160 with magnet 158 installed is about 2 mm thick with the tether extending about a further 2 mm. The diameter of the anchor body is about 11/16 inch or about 18 mm. The diameter of the magnet is approximately 7/8 inch (1 cm).

FIG. 10 shows a new clip 170 for securing ring 52 to an anchor point of an object. Clip 170 may be sized for securing through an aperture in the object as well as through ring 52. In the present example clip 170 is a metal body (which may be a ferromagnetic material but need not be) with sufficient resilience/spring on opposing ends of the clip to remain closed when the ends 172A and 172B are clipped to one another. In one example, the clip is about 1.25 inches (about 3 cm) in diameter. Other clips or loops or line may be used.

FIG. 11 shows an end view of installing and removing apparatus 100, in an operative combination with the magnet head body 20 of magnet head 16A carrying a flush magnet anchor 150 with a ring 52 and a clip 170 on the ring 52. Leg 34 receives the ring 52 and leg 34 is positioned to face a front (or rear) side of base 114 rather than an end as shown in FIG. 4. The magnet body 20 may be rotated to adjust the position of the leg 34 and hook 32 may be used as a lever.

FIG. 13 shows installing and removing apparatus 100 in a side view in an operative combination with flush magnet anchors 150, clips 170, a sign 180 and a portion of an extension pole 182. Sign 180 has a pair of spaced anchor points 182A and 182B comprising apertures protected by grommets. Magnet heads 16A and 16B are spaced to align with the anchor points 182A and 182B.

To install the magnet anchors (e.g. 150) and an object such as a sign 180 depending therefrom to a metallic surface (of a ferromagnetic material), the following procedure may be followed. The magnet heads 16A and 16B are aligned with the spaced anchor points 182A and 182B of the object (e.g. 180), such as by moving the magnet heads 16A and 16B along channel opening 118 of base 114. The magnet heads 16A and 16B may be rotated to align the transfer channel 26 parallel to the longitudinal axis of the base 114 so that the rings hang on a same side of base 114 when flush magnet anchors 150 are mounted.

Flush magnet anchors 150 are assembled with respective clips 170 and clips 170 are secured at the anchor points 182A and 182B. Flush magnet anchors 150 are mounted to magnet heads 16A and 16B. Ring 52 is mounted partially in channel 26 and over leg 34. Other magnet anchors (e.g. 50) can be used. The apparatus 100 is lifted via pole 182 and raised to position the flush magnet anchors 150 to a metallic surface such as a ceiling and the magnets installed, releasing the apparatus 100 from the magnet anchors.

FIG. 14. shows an enlarged fragmentary view of a corner of the sign 180 (object) suspended from flush magnet anchor 150 and clip 170 which are magnetically coupled to a surface such as from a ceiling.

While shown as an apparatus for selectively securing to an installation pole, the base may be secured to a pole in a permanent manner.

It will be appreciated that there is disclosed herein a flush magnet anchor comprising: an anchor body having first and second exterior and opposing surfaces, the anchor body forming a recess; and, a magnet mounted in the recess such that an exterior surface of the magnet and the first exterior surface of the anchor body are coplanar; and, wherein the anchor body comprises a tether in the second exterior surface.

In any of the configurations, the tether may be an eyelet formed in the second exterior surface. In any of the configurations, the anchor body may be shaped as a bowl having a rim defining the first exterior surface and wherein the magnet is mounted in the bowl. In any of the configurations, the anchor body may be of a ferromagnetic material. In any of the configurations, the anchor body may further comprise a ring mounted in the tether.

There is disclosed a magnet installing and removing apparatus comprising: a base forming a channel; and at least two magnet heads mounted to the base in the channel, each of the at least two magnet heads configured to receive respective magnet anchors; and, wherein the magnet heads are selectively movable along the base in the channel. The base may comprise an extruded rail defining the channel, the channel having a channel opening. The extruded rail may be an aluminium alloy. In any of the configurations, the base may comprise a generally U-shape with upper ends of the U shape turned inwardly toward one another to define the channel opening along which the magnet heads may be moved. In any of the configurations having an extruded rail, the magnet installing and removing apparatus may comprise ends caps for the extruded rail.

In any of the configurations, the base may be secured to an installation head configured to mount to an installation pole or may be secured directly to an installation pole.

In any of the configurations, each of the at least two magnet heads may comprises a hook for removing an installed magnet anchor. In any of the configurations, each of the magnet heads may comprise a body having a transverse channel defining a leg to receive a ring of a magnet anchor.

In any of the configurations, each of the magnet heads may comprise a fastener and at least one washer for mounting to the base. The at least one washer may comprise a plastic body or coating for slidably moving along the base. The magnet installing and removing apparatus may comprising a spring around the fastener biasing the at least one washer against the base.

There is disclosed a system comprising: a plurality of magnet anchors in accordance with any of the configurations disclosed herein; and a magnet installing and removing apparatus of any of the configurations disclosed herein; and, wherein at least some of the plurality of magnet anchors are mounted to the at least two magnet heads. The system may further including at least two clips clipped respectively to the magnet anchors mounted to the at least two magnet heads.

There is disclosed a method of hanging an object having spaced apart anchor points comprising: providing a magnet installing and removing apparatus according to any of the configurations newly disclosed herein, the apparatus having a magnet head for each of the spaced apart anchor points; aligning each magnet head to align with the spaced apart anchor points; coupling respective magnet anchors to the anchor points; mounting the respective magnet anchors to each magnet head; and installing the respective magnet anchors to a magnetic surface. In any of the method embodiments, the respective magnet anchors may be flush magnet anchors in accordance with any of the respective flush magnet anchor configurations disclosed herein.

The magnet anchors may be coupled to the anchor points using a clip.

In any of the method embodiments, the method may comprise sliding each magnet head along the base to align with the spaced apart anchor points.

In any of the method embodiments, the object may be a sign having apertures defining the anchor points.

It will be understood that, of course, that modifications can be made in the examples illustrated and described herein without departing from the scope and purview of the teachings herein.

What is claimed is:

1. A magnet installing and removing apparatus comprising:
   a base forming a channel; and
   at least two magnet heads mounted to the base in the channel, each of the at least two magnet heads configured to receive respective magnet anchors to install the respective magnet anchors to a metallic surface and release the apparatus from the respective magnet anchors, each of the respective magnet anchors comprising a magnet; and,
   wherein the magnet heads are selectively movable along the base in the channel.

2. The magnet installing and removing apparatus of claim 1 wherein the base comprises an extruded rail defining the channel, the channel having a channel opening.

3. The magnet installing and removing apparatus of claim 1 wherein the base comprises a generally U-shape with upper ends of the U shape turned inwardly toward one another to define the channel opening along which the magnet heads may be moved.

4. The magnet installing and removing apparatus of claim 1 wherein the base is secured to an installation pole.

5. The magnet installing and removing apparatus of claim 4 wherein the base is secured to an installation head configured to mount to the installation pole.

6. The magnet installing and removing apparatus of claim 1 wherein each of the at least two magnet heads comprises a hook for removing an installed magnet anchor.

7. The magnet installing and removing apparatus of claim 1 wherein each of the magnet heads comprises a body having a transverse channel defining a leg to receive a ring of a magnet anchor.

8. The magnet installing and removing apparatus of claim 1 wherein each of the magnet heads comprises a fastener and at least one washer for mounting to the base.

9. The magnet installing and removing apparatus of claim 8 comprising a spring around the fastener biasing the at least one washer against the base.

10. A system comprising:
    a plurality of magnet anchors, each magnet anchor comprising:
      an anchor body having first and second exterior and opposing surfaces, the anchor body forming a recess; and,
      a magnet mounted in the recess such that an exterior surface of the magnet and the first exterior surface of the anchor body are coplanar; and,
      wherein the anchor body comprises a tether in the second exterior surface; and
    a magnet installing and removing apparatus comprising:
      a base forming a channel; and
      at least two magnet heads mounted to the base in the channel, each of the at least two magnet heads configured to receive respective magnet anchors; and, wherein the magnet heads are selectively movable along the base in the channel; and,
    wherein at least some of the plurality of magnet anchors are mounted to the at least two magnet heads.

11. The system of claim 10 wherein each of the at least two magnet heads are configured to receive respective magnet anchors to install the respective magnet anchors to a metallic surface and release the apparatus from the respective magnet anchors.

12. A method of hanging an object having spaced apart anchor points comprising:
    providing a magnet installing and removing apparatus comprising:
      a base forming a channel; and
      at least two magnet heads mounted to the base in the channel, each of the at least two magnet heads configured to receive respective magnet anchors each of the respective magnet anchors having a magnet; and,
      wherein the magnet heads are selectively movable along the base in the channel; and,
      wherein the apparatus has a magnet head for each of the spaced apart anchor points;
    aligning each magnet head to align with the spaced apart anchor points;
    coupling respective magnet anchors to the anchor points;
    mounting the respective magnet anchors to each magnet head; and
    installing the respective magnet anchors to a magnetic surface.

13. The method of claim 12 wherein the respective magnet anchors are flush magnet anchors comprising:
    an anchor body having first and second exterior and opposing surfaces, the anchor body forming a recess; and,
    wherein the magnet is mounted in the recess such that an exterior surface of the magnet and the first exterior surface of the anchor body are coplanar; and,
    wherein the anchor body comprises a tether in the second exterior surface.

14. The method of claim 12 wherein the magnet anchors are coupled to the anchor points using a clip.

15. The method of claim 12 comprising sliding each magnet head along the base to align with the spaced apart anchor points.

16. The method of claim 12 wherein the object is a sign having apertures defining the anchor points.

17. A magnet installing and removing apparatus comprising:
- a base forming a channel; and
- at least two magnet heads mounted to the base in the channel, each of the at least two magnet heads configured to receive respective magnet anchors, each of the respective magnet anchors having a magnet;
- wherein the magnet heads are selectively movable along the base in the channel; and
- wherein each of the magnet heads comprises a body having a transverse channel defining a leg to receive a ring of a magnet anchor.

18. The magnet installing and removing apparatus of claim 17 wherein each of the at least two magnet heads are configured to receive respective magnet anchors to install the respective magnet anchors to a metallic surface and release the apparatus from the respective magnet anchors.

19. The magnet installing and removing apparatus of claim 18 wherein each of the at least two magnet heads comprises a hook for removing an installed magnet anchor.

20. The magnet installing and removing apparatus of claim 19 wherein each of the magnet heads comprises a fastener and at least one washer for mounting to the base; and a spring around the fastener biasing the at least one washer against the base.

* * * * *